Reissued Aug. 26, 1924. Re. 15,902

UNITED STATES PATENT OFFICE.

SALIM F. ZALOOM, OF NEW YORK, N. Y., ASSIGNOR TO ROYAL NUT COMPANY, A CORPORATION OF NEW YORK.

PRESERVING COMPOUND FOR PISTACHIO NUTS.

No Drawing. Original No. 1,460,510, dated July 3, 1923, Serial No. 569,972, filed June 21, 1922. Application for reissue filed May 15, 1924. Serial No. 713,620.

*To all whom it may concern:*

Be it known that I, SALIM F. ZALOOM, a citizen of the United States of America, residing at New York, in the county of New York and State of New York, have invented certain new and useful Improvements in Preserving Compounds for Pistachio Nuts; and I do hereby declare the following to be a full, clear, and exact description of the invention, such as will enable others skilled in the art to which it appertains to make and use the same.

This invention relates to the art of preserving foods and more particularly to the art of preserving pistachio nuts.

It is an object of the invention to provide a preserving compound for nuts and more particularly to provide a preserving compound which will give to the shells of nuts, as pistachio nuts, a whitish appearance. It is common practice to treat pistachio nuts with a salt solution but when treated with a simple salt solution the shells take on a brownish appearance. According to the present invention the nuts are treated with a salt solution containing an adhesive, preferably gum-arabic, the adhesive causing the salt to adhere to the shells in the form of minute crystals whereby the shells take on a dull white appearance. The protective covering thus obtained not only more effectually preserves the nuts but also makes the same a more popular article of commerce due to their more attractive appearance. Additionally, the nuts so treated are provided with a layer of salt and are thus made more delectable as an article of food.

I have found that when gum-arabic and salt are combined in certain proportions, the pistachio nuts not only firmly retain the salt but that the shells take on a dull white appearance in contrast to the brownish appearance which obtains when salt alone is used. This dull white finish or coating not only gives the nuts an attractive appearance but also assists in preserving the same, inasmuch as this coating consists of minute salt crystals.

The formula for preparing the compound is substantially as follows:

2 pounds pure gum-arabic, 100 pounds salt (sodium chloride), 40 gallons of water in which the salt and gum-arabic are boiled.

The above quantity is sufficient for application to 1000 pounds of pistachio nuts. The nuts are sprayed with the above liquid while they are in the roaster, the heat of the roaster drying the nuts so that no separate drying process is necessary.

What is claimed is:

1. A compound for treating pistachio nuts consisting of sodium chloride and gum-arabic in aqueous solution.

2. A compound for treating pistachio nuts which consists of 100 pounds of sodium chloride, 2 pounds gum-arabic in an aqueous solution.

3. A compound for application to pistachio nuts comprising the following ingredients in substantially the proportions specified, namely, 100 pounds sodium chloride, 2 pounds gum-arabic and 40 gallons of water.

4. The method of treating pistachio nuts which consists of spraying them with an aqueous solution of sodium chloride and gum-arabic while the nuts are passing through a roaster.

5. The method of treating nuts to give the shells thereof a whitish appearance which consists in covering the shells with an intimate mixture of salt and a mucilaginous substance.

6. As a new article of food, a nut, the shell of which is coated with a uniform adhering layer of an intimate mixture of salt and a mucilaginous substance, whereby the shell is given a whitish appearance.

In testimony whereof, I affix my signature.

SALIM F. ZALOOM.